(12) United States Patent
Lee et al.

(10) Patent No.: US 12,488,432 B2
(45) Date of Patent: Dec. 2, 2025

(54) METHOD AND DEVICE FOR TRAINING NEURAL NETWORK MODEL TO BE ROBUST TO CHANGES IN BRIGHTNESS OF INPUT DATA

(71) Applicant: EL ROI LAB INC., Seoul (KR)

(72) Inventors: Jungi Lee, Seoul (KR); Ji Seong Yoon, Seoul (KR); Myoung Hwan Kim, Seoul (KR); Jeong Hyeon Park, Seoul (KR); Kwangsun Yoo, Incheon (KR); Seok Joo Byun, Gyeonggi-do (KR)

(73) Assignee: EL ROI LAB INC., Seoul (KR)

( * ) Notice: Subject to any disclaimer, the term of this patent is extended or adjusted under 35 U.S.C. 154(b) by 0 days.

(21) Appl. No.: 19/204,646

(22) Filed: May 12, 2025

(65) Prior Publication Data

US 2025/0348977 A1 Nov. 13, 2025

(30) Foreign Application Priority Data

May 10, 2024 (KR) ........................ 10-2024-0061724

(51) Int. Cl.
*G06T 5/00* (2024.01)
*G06T 5/60* (2024.01)

(52) U.S. Cl.
CPC ...... *G06T 5/60* (2024.01); *G06T 2207/20081* (2013.01); *G06T 2207/20084* (2013.01)

(58) Field of Classification Search
CPC ............. G06T 5/60; G06T 2207/20081; G06T 2207/20084
See application file for complete search history.

(56) References Cited

U.S. PATENT DOCUMENTS

| | | | |
|---|---|---|---|
| 2010/0008573 A1* | 1/2010 | Tajbakhsh | H04N 23/88 382/167 |
| 2013/0342557 A1* | 12/2013 | Finlayson | H04N 1/60 358/1.9 |
| 2020/0226720 A1* | 7/2020 | Mirzaei Domabi | G05D 1/0251 |
| 2020/0320682 A1 | 10/2020 | Alexander et al. | |
| 2021/0058596 A1* | 2/2021 | Afifi | G06N 3/08 |
| 2021/0407045 A1* | 12/2021 | Mironica | G06T 3/40 |
| 2023/0061884 A1* | 3/2023 | Kim | G06V 10/776 |
| 2023/0239583 A1 | 7/2023 | Vercauteren et al. | |
| 2023/0360178 A1* | 11/2023 | Hung | G06V 20/588 |
| 2023/0385986 A1* | 11/2023 | Park | G06N 3/09 |
| 2024/0233080 A9* | 7/2024 | Yu | G06T 5/50 |

OTHER PUBLICATIONS

KIPO, Notice of Refusal to Grant a Patent for Korean Patent Application No. 10-2024-0061724, Jul. 22, 2024.
KIPO, Notice of Refusal to Grant a Patent for Korean Patent Application No. 10-2024-0061724, Jan. 15, 2025.
KIPO, Decision to Grant a Patent for Korean Patent Application No. 10-2024-0061724, Feb. 26, 2025.

* cited by examiner

*Primary Examiner* — Van D Huynh
(74) *Attorney, Agent, or Firm* — Nicholas Park

(57) ABSTRACT

Disclosed is a method of training a neural network model, performed by a neural network model training device, the method including converting input data to a red, green, blue (RGB) image; calculating a correction constant based on a generation method of the input data; and training the neural network model using the correction constant.

4 Claims, 4 Drawing Sheets ically models virtual neurons and then simulates them to have learning capability similar to the human brain, and is mainly used for pattern recognition. An artificial neural network model used for deep learning has a structure that is constructed by repeatedly performing linear fitting and nonlinear transformation or activation. The neural network model used for deep learning may include a deep neural network (DNN), a convolutional neural network (CNN), a recurrent neural network (RNN), a restricted Boltzmann machine (RBM), a deep belief network (DBN), and deep Q-networks.

METHOD AND DEVICE FOR TRAINING NEURAL NETWORK MODEL TO BE ROBUST TO CHANGES IN BRIGHTNESS OF INPUT DATA

CROSS-REFERENCE TO RELATED APPLICATION(S)

This application claims priority from and the benefit of Korean Patent Application No. 10-2024-0061724 filed on May 10, 2024, which is hereby incorporated by reference in its entirety.

BACKGROUND

Technical Field

The following example embodiments relate to a method and device for training a neural network model to be robust to a change in brightness of input data.

Related Art

Machine learning refers to a type of artificial intelligence (AI) that allows a computer to perform prediction tasks, such as regression, classification, and clustering, based on what the computer has learned on its own based on data.

Deep learning refers to a field of machine learning that teaches a computer how humans think and may be defined as a set of machine learning algorithms that attempt to achieve high-level abstraction (task of summarizing key content or function from a large amount of data or complex data) through a combination of various nonlinear transformation methods.

A deep learning structure is a concept that is designed based on artificial neural networks (ANNs). The artificial neural network refers to an algorithm that mathematically models virtual neurons and then simulates them to have learning capability similar to the human brain, and is mainly used for pattern recognition. An artificial neural network model used for deep learning has a structure that is constructed by repeatedly performing linear fitting and nonlinear transformation or activation. The neural network model used for deep learning may include a deep neural network (DNN), a convolutional neural network (CNN), a recurrent neural network (RNN), a restricted Boltzmann machine (RBM), a deep belief network (DBN), and deep Q-networks.

In a training process of deep learning, parameters may be optimized by inputting training data to the artificial neural network model.

Meanwhile, a hyperspectral image refers to an image that disassembles and digitizes light in detail, including not only visible light that a human may see, but also infrared ray and ultraviolet ray that the human may not see, and is widely used in various fields such as defect detection and quality management.

Although a hyperspectral image is captured in the same environment and location, the lighting of a shooting location may age and accordingly, the quantity of light of the lighting may decrease, which may cause a change in the spectrum included in the hyperspectral image.

In the case of using the hyperspectral image with the altered spectrum as input data of the neural network model, output results may differ, which may lead to false detection and over-detection issues.

SUMMARY

At least one example embodiment provides a method and device for training an artificial neural network to be robust to a change in brightness of input data.

However, subjects to be achieved by the present invention are not limited to those described above, and still other subjects not described herein will be clearly understood by one of ordinary skill in the art to which the present invention pertains from the following description.

According to an example embodiment, there is provided a method of training a neural network model, performed by a neural network model training device, the method including training the neural network model by applying a correction constant generated from input data to the input data.

The method of training the neural network model may include converting the input data to a red, green, blue (RGB) image; calculating the correction constant based on a generation method of the input data; and training the neural network model using the correction constant.

The calculating of the correction constant may include calculating the correction constant using GrayWorld algorithm when the input data is generated in line units.

The calculating of the correction constant using the GrayWorld algorithm may include generating a gray scale image by performing a gray scale transform on the RGB image; detecting an edge area in the gray scale image; extracting the edge area; and calculating the correction constant using a maximum value of the edge area.

The calculating of the correction constant may include calculating the correction constant using Gray-Edge algorithm when the input data is not generated in line units or input after generation is completed.

The calculating of the correction constant using the Gray-Edge algorithm may include generating a gray scale image by performing a gray scale transform on the RGB image; and calculating the correction constant using a maximum value of the gray scale image.

The calculating of the correction constant may include calculating the correction constant using dark reference data and white reference data.

The training of the neural network model may include generating corrected data by applying the correction constant to the input data; and training the neural network model by inputting the corrected data to the neural network model as training data.

The input data may include a hyperspectral image.

According to another example embodiment, there is provided a neural network model training device including a memory configured to store a neural network model training program for training a neural network model; and a processor configured to control the memory, wherein the processor is configured to convert input data to an RGB image, to calculate a correction constant based on a generation method of the input data, and to train the neural network model using the correction constant.

When the input data is generated in line units, the processor may generate a gray scale image by performing a gray scale transform on the RGB image, may detect an edge area in the gray scale image, may extract the edge area, and may calculate the correction constant using a maximum value of the edge area.

When the input data is not generated in line units or input after generation is completed, the processor may generate a gray scale image by performing a gray scale transform on the RGB image; and may calculate the correction constant using a maximum value of the gray scale image.

The processor may calculate the correction constant using dark reference data and white reference data.

The processor may generate corrected data by applying the correction constant to the input data, and may train the neural network model by inputting the corrected data to the neural network model as training data.

According to example embodiments, since a hyperspectral image used as training data of a neural network model is corrected using a correction constant, the same quality hyperspectral image may be input to the neural network model although the hyperspectral image is captured darkly due to low intensity of lighting.

According to example embodiments, by inputting a hyperspectral image corrected using a correction constant as training data of a neural network model, the neural network model may be trained to be robust to a change in brightness of the hyperspectral image.

Effects achievable from the present disclosure are not limited to those described above and other effects not described herein may be clearly understood by one of ordinary skill in the art from the following description.

BRIEF DESCRIPTION OF THE FIGURES

Various aspects are described with reference to the accompanying drawings and, herein, like reference numerals refer to like elements throughout. In the following example embodiments, numerous specific details are set forth herein to provide thorough understanding of at least one aspect for the purpose of explanation. However, it will be apparent that such aspect(s) may be practiced without the specific details. In other examples, known structures and devices are illustrated in a form of a block diagram to easily describe at least one aspect.

DETAILED DESCRIPTION

The advantages and features of the present invention and the methods for achieving the same will become apparent with example embodiments described in detail below with reference to the accompanying drawings. However, the present invention is not limited to the example embodiments disclosed below and may be implemented in various different forms, and the example embodiments are simply provided to complete the disclosure of the present invention and to fully inform one of ordinary skill in the art of the scope of the invention and the present invention is defined by the scope of the claims.

When it is determined that detailed description related to a known function or configuration may unnecessarily obscure the gist of the present invention in describing example embodiments of the present invention, the detailed description will be omitted. The terms described below are terms defined in consideration of functions in the example embodiments of the present invention and may vary depending on intent of a user or an operator, custom, and the like. Therefore, the definition needs to be made based on the contents throughout the present specification.

Figure 1:
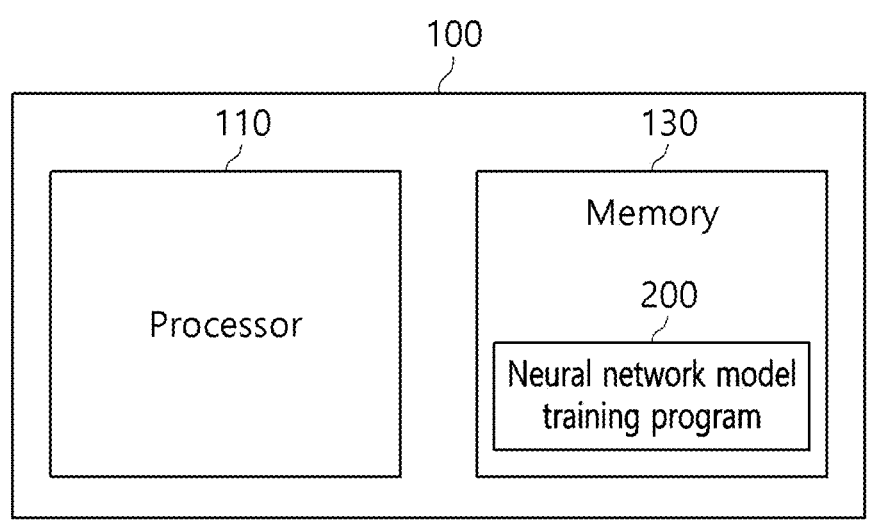
FIG. 1 is a block diagram illustrating a neural network model training device according to an example embodiment.

FIG. 1 is a block diagram illustrating a neural network model training device according to an example embodiment.

Referring to FIG. 1, a neural network model training device 100 relates to training a neural network model (e.g., neural network model that uses a hyperspectral image as input data) to be robust (i.e., such that there is no change in performance although brightness of input data changes) in a situation in which brightness of input data varies (e.g., intensity of lighting varies in an environment in which input data is captured), and may include a processor 110 and a memory 130.

The processor 110 may control the overall operation of the neural network model training device 100.

The memory 130 may store a neural network model training program 200 and information required to execute the neural network model training program 200.

Herein, the neural network model training program 200 may represent software that includes instructions programmed to train the neural network model to be robust in a situation in which brightness of input data changes.

To execute the neural network model training program 200, the processor 110 may load the neural network model training program 200 and information required to execute the neural network model training program 200 from the memory 130.

The processor 110 may train the neural network model by executing the neural network model training program 200.

The function and/or operation of the neural network model training program 200 will be described in detail with reference to FIG. 2.

Figure 2:
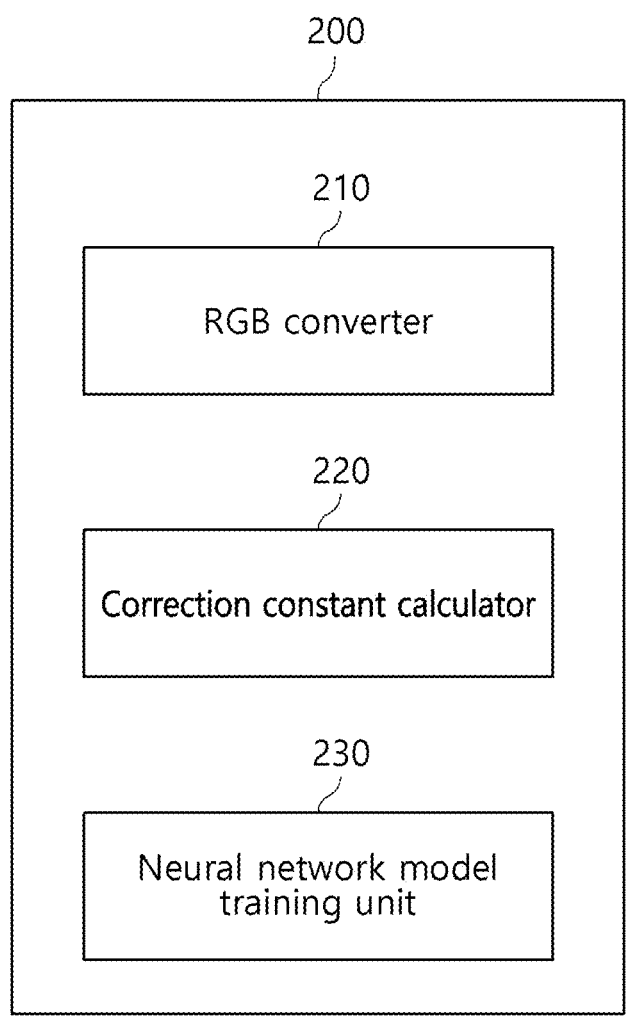
FIG. 2 is a block diagram conceptually illustrating the function of a neural network model training program according to an example embodiment.

FIG. 2 is a block diagram conceptually illustrating the function of a neural network model training program according to an example embodiment.

Referring to FIG. 2, a neural network model training program 200 may include a red, green, blue (RGB) converter 210, a correction constant calculator 220, and a neural network model training unit 230.

The RGB converter 210, the correction constant calculator 220, and the neural network model training unit 230 are acquired by conceptually dividing the function of the neural network model training program 200, to easily explain the function of the neural network model training program 200, and is not limited thereto. Depending on example embodiments, the function of each of the RGB converter 210, the correction constant calculator 220, and the neural network model training unit 230 may be merged/separated, and may be implemented as a series of instructions included in a single program.

The RGB converter 210 may convert input data to an RGB image.

For example, the RGB converter 210 may convert a hyperspectral image corresponding to the input data to the RGB image.

The correction constant calculator 220 may calculate the correction constant to train the neural network model to be robust to a change in brightness of the input data using the RGB image.

In detail, the correction constant calculator 220 may calculate the correction constant using dark reference data and white reference data according to Equation 1 below.

$$R(\lambda) = \alpha \frac{R(\lambda) - R_d(\lambda)}{R_w(\lambda) - R_d(\lambda)} \quad \text{[Equation 1]}$$

Here, $R(\lambda)$ denotes the input data (before correction), $\alpha$ denotes the correction constant, $R_d(\lambda)$ denotes the dark reference data, and $R_w(\lambda)$ denotes the white reference data.

Depending on example embodiments, the correction constant calculator 220 may calculate the correction constant based on a generation method of the input data.

In detail, the correction constant calculator 220 may select an algorithm to be used for calculating the correction constant between Gray-Edge algorithm and GrayWorld algorithm based on the generation method of the hyperspectral image and may calculate the correction constant using the selected algorithm.

For example, when the hyperspectral image is generated in line units, the correction constant calculator 220 may calculate the correction constant using the GrayWorld algorithm.

On the other hand, when the hyperspectral image is input as is, or when the hyperspectral image is not generated in line units, the correction constant calculator 220 may calculate the correction constant using one of the Gray-Edge algorithm and the GrayWorld algorithm.

In the case of using the Gray-Edge algorithm, the correction constant calculator 220 may calculate the correction constant through the following process of:

1) generating a gray scale image by performing a gray scale transform on the RGB image;
2) detecting an edge area in which an object may be distinguished from another object or background in the gray scale image;
3) extracting the detected edge area; and
4) calculating the correction constant using a maximum value of the edge area (e.g., calculating correction constant using Equation 2 below).

$$\alpha = \frac{128}{\text{Max[Grey Edges]}} \quad \text{[Equation 2]}$$

Also, in the case of using the GrayWorld algorithm, the correction constant calculator 220 may calculate the correction constant through the following process of:

1) generating a gray scale image by performing a gray scale transform on the RGV image; and
2) calculating the correction constant using a maximum value of the gray scale image (e.g., calculating correction constant using Equation 3 below).

$$\alpha = \frac{128}{\text{Max[Grey Image]}} \quad \text{[Equation 3]}$$

In Equation 2 and Equation 3, 128 is a constant that represents an average value of RGB.

As shown in Equation 2, when the hyperspectral image is generated in line units, an edge area may not be detected in the image in real time. Therefore, the correction constant calculator 220 may calculate the correction constant using the GrayWorld algorithm.

Also, as shown in Equation 2 and Equation 3, the GrayWorld algorithm has a relatively short process compared to the Gray-Edge algorithm, so may very quickly calculate the correction constant. Therefore, depending on example embodiments, when the hyperspectral image is input as is, or when the hyperspectral image is not generated in line units, the correction constant calculator 220 may calculate the correction constant using the GrayWorld algorithm for a calculation speed.

The neural network model training unit 230 may train the neural network model using the calculated correction constant.

In the aforementioned method, in the case of utilizing the average value by generating the correction constant using the maximum value of the edge area or the maximum value of the gray scale image, it is possible to support stable correction constant generation by enhancing a significant change in the correction constant.

In detail, the neural network model training unit 230 may generate corrected data (e.g., corrected hyperspectral image) by applying the correction constant to the input data (e.g., hyperspectral image spectral data included in hyperspectral image) and may train the neural network model by inputting the corrected data to the neural network model as training data.

For example, the neural network model training unit 230 may generate the corrected hyperspectral image by multiplying the hyperspectral image by the correction constant.

The neural network model training unit 230 may input the corrected hyperspectral image to the neural network model as training data, and may correct the change in the input data according to the change in the brightness (e.g., hyperspectral image is captured darkly due to decrease in intensity of lighting).

Figure 3:
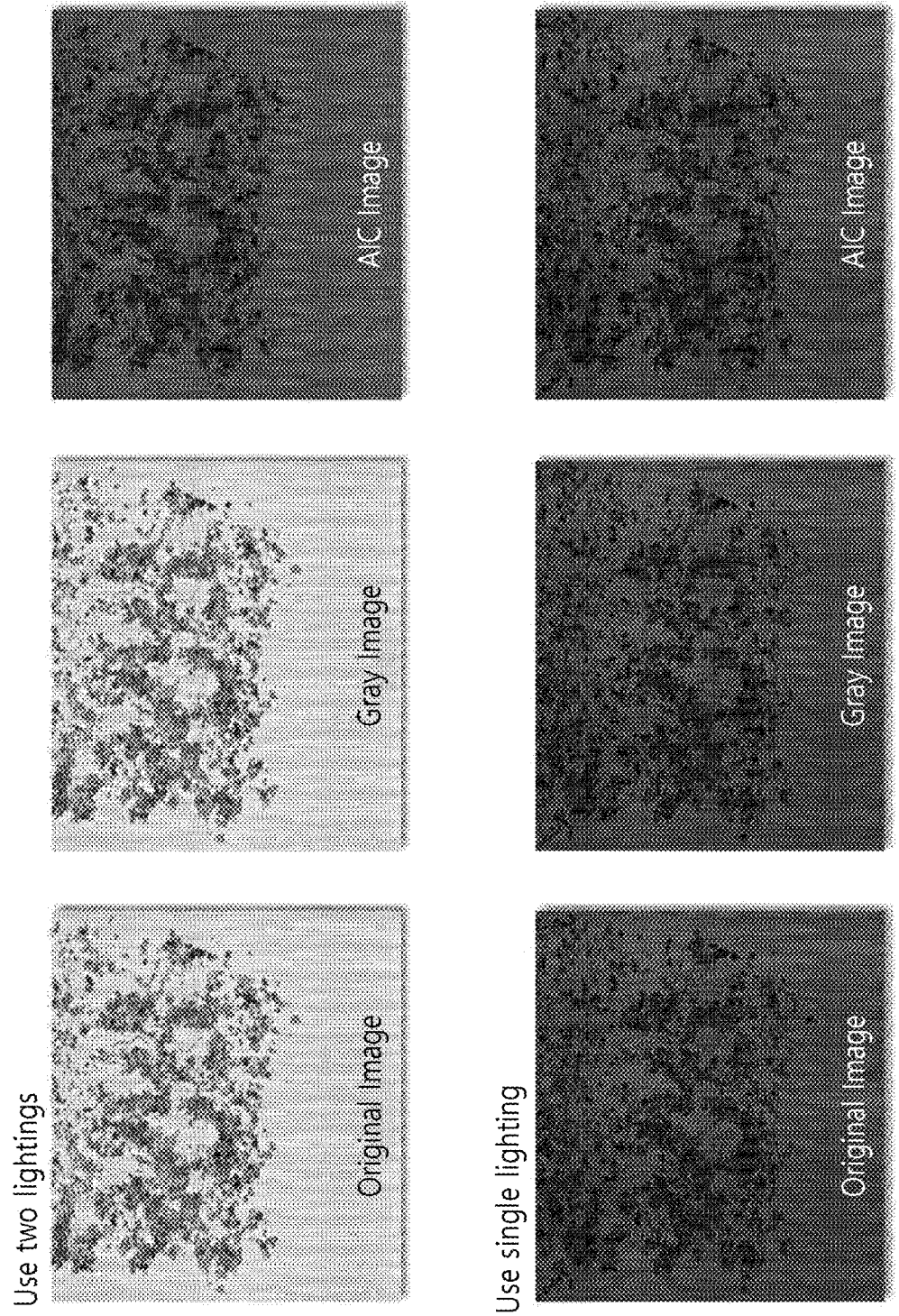
FIG. 3 illustrates an example of correcting input data using a neural network model training device according to an example embodiment.

FIG. 3 illustrates an example of correcting input data using a neural network model training device according to an example embodiment.

Referring to FIG. 3, upper images represent hyperspectral images captured using two lightings and lower images represent hyperspectral images captured using only a single lighting (i.e., one of two lightings is removed).

Also, "Original Image" represents the hyperspectral image before correction using a correction constant, "Gray Image" represents a gray scale image acquired by performing a gray scale transform on the hyperspectral image, and "AIC Image" represents the hyperspectral image corrected using the correction constant.

As shown in FIG. 3, there is a great difference in brightness between the upper hyperspectral images and the lower hyperspectral images due to the number of lightings, but the upper hyperspectral images and the lower hyperspectral images are corrected using the correction constant and accordingly, are corrected to a level at which there is almost no difference in brightness therebetween.

Therefore, by correcting the hyperspectral image using the neural network model training device 100, it is possible to input training data with constant quality to the neural network model regardless of the change in brightness and to improve the training accuracy of the neural network model.

Figure 4:
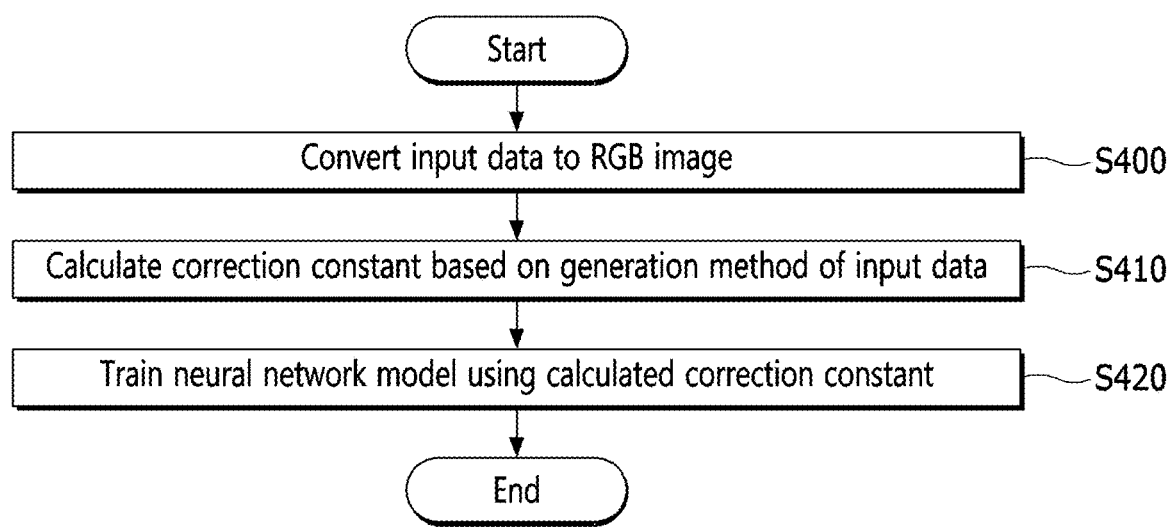
FIG. 4 is a flowchart illustrating a method of training a neural network model using a neural network model training program according to an example embodiment.

FIG. 4 is a flowchart illustrating a method of training a neural network model using a neural network model training program according to an example embodiment.

Referring to FIGS. 2 and 4, depending on example embodiments, the RGB converter 210 may convert input data to an RGB image in operation S400, and the correction constant calculator 220 may calculate a correction constant based on a generation method of the input data in operation S410.

In operation S420, the neural network model training unit 230 may train a neural network model using the calculated correction constant.

According to example embodiments, since a hyperspectral image used as training data of a neural network model is corrected using a correction constant, the same quality hyperspectral image may be input to the neural network model although the hyperspectral image is captured darkly due to low intensity of lighting.

According to example embodiments, by inputting a hyperspectral image corrected using a correction constant as training data of a neural network model, the neural network model may be trained to be robust to a change in brightness of the hyperspectral image.

Combinations of the respective blocks of the block diagram and the respective operations of the flowchart attached herein may be performed by computer program instructions. The computer program instructions may be embedded in an encoding processor of a general-purpose computer, a special-purpose computer, or other programmable data processing equipment. Therefore, the instructions performed through an encoding processor of the computer or other programmable data processing equipment generate methods of performing functions described in the respective blocks of the block diagram or the respective operations of the flowchart. The computer program instructions may also be stored in a computer-available or computer-readable memory that may direct the computer or other programmable data processing equipment to implement the function with a specific method. Therefore, the instructions stored in the computer-available or computer-readable memory may also product a manufacture item that includes an instruction method for performing a function described in each block of the block diagram or each operation of the flowchart. Since the computer program instructions may also be installed on the computer or other programmable data processing equipment, instructions for performing the computer or other programmable data processing equipment in such a manner that a series of operations are performed on the computer or other programmable data processing equipment may provide operations for executing functions described in the respective blocks of the block diagram and the respective operations of the flowchart.

Also, each block or each operation may represent a portion of a module, a segment, or a code that includes one or more executable instructions for executing specified logical function(s). Also, in some alternative example embodiments, it should be noted that functions described in blocks or operations may occur out of order. For example, two blocks or operations illustrated in succession may be substantially performed at the same time, or the blocks or the operations may sometimes be performed in reverse order depending on a corresponding function.

The above description is simply an example of the technical spirit of the present invention and one skilled in the art will appreciate that various modifications and alterations may be made to the example embodiments without departing from the technical spirit of the present invention. Therefore, the example embodiments disclosed herein are not intended to limit the technical spirit of the present invention but to explain it, and the scope of the technical spirit of the present invention is not limited by the example embodiments. The protection scope of the present invention should be interpreted by the claims and all the technical spirit that falls within the equivalent scope thereof should be interpreted to be included in the scope of rights of the present invention.

What is claimed is:

1. A method of training a neural network model, performed by a neural network model training device, the method comprising:

training the neural network model by applying a correction constant, which is generated from input data corresponding to a hyperspectral image and is configured to be robust to a change in brightness of the input data, to the input data, wherein the training comprises:

converting the input data to a red, green, blue (RGB) image;

calculating the correction constant based on a generation method of the input data; and training the neural network model using the correction constant, wherein the calculating the correction constant includes at least one of the following steps i) to iii):

i) calculating the correction constant using GrayWorld algorithm when the input data is generated in line units, ii) calculating the correction constant using Gray-Edge algorithm when the input data is not generated in line units or input after generation is completed, iii) calculating the correction constant using dark reference data and white reference data, wherein the calculating of the correction constant using the GrayWorld algorithm comprises:

generating a gray scale image by performing a gray scale transform on the RGB image;

detecting an edge area in the gray scale image;

extracting the edge area; and calculating the correction constant using a maximum value of the edge area, wherein the calculating the correction constant using a maximum value of the edge area comprises:

calculating the correction constant based on Equation 2, wherein Equation 2 is:

$$\alpha = \frac{128}{\text{Max}[\text{Grey Edges}]},$$

wherein the $\alpha$ is correction constant and the Max[Grey edges] is the maximum value of the edge area.

2. The method of claim 1, wherein the calculating of the correction constant using the Gray-Edge algorithm comprises:

generating a gray scale image by performing a gray scale transform on the RGB image; and calculating the correction constant using a maximum value of the gray scale image, wherein the calculating the correction constant using a maximum value of the gray scale image comprises:

calculating the correction constant based on Equation 3, wherein Equation 3 is:

$$\alpha = \frac{128}{\text{Max}[\text{Grey Image}]},$$

wherein the $\alpha$ is correction constant and the Max[Grey Image] is the maximum value of the edge area.

3. The method of claim 1, wherein the training of the neural network model comprises:

generating corrected data by applying the correction constant to the input data; and training the neural network model by inputting the corrected data to the neural network model as training data.

4. A neural network model training device comprising:
a memory configured to store a neural network model training program for training a neural network model; and
a processor configured to control the memory,
wherein the processor is configured to,
convert input data corresponding to a hyperspectral image to a red, green, blue (RGB) image,
calculate a correction constant, which is configured to be robust to a change in brightness of the input data, based on a generation method of the input data, and
train the neural network model using the correction constant,
wherein the processor is configured to,
calculate the correction constant using GrayWorld algorithm when the input data is generated in line units, and
calculate the correction constant using Gray-Edge algorithm when the input data is not generated in line units or input after generation is completed.

* * * * *